United States Patent [19]
Carter et al.

[11] Patent Number: 5,456,490
[45] Date of Patent: Oct. 10, 1995

[54] HIDDEN DOOR FOR AN AIR BAG RESTRAINT SYSTEM

[75] Inventors: James Carter, Altamonte Springs, Fla.; Michael J. Gallagher, Hampton; Peter J. Iannazzi, Hampstead, both of N.H.

[73] Assignee: Davidson Textron Inc., Dover, N.H.

[21] Appl. No.: 196,036

[22] Filed: Feb. 14, 1994

Related U.S. Application Data

[63] Continuation-in-part of Ser. No. 929,018, Aug. 13, 1992, abandoned.

[51] Int. Cl.$^6$ ................................................. B60R 22/20
[52] U.S. Cl. ................................. 280/728.3; 280/732
[58] Field of Search .................... 280/728 B, 732, 280/728, 752, 728.3, 728.1; 264/45.3; 428/317.9

[56] References Cited

U.S. PATENT DOCUMENTS

| | | | |
|---|---|---|---|
| 3,382,302 | 5/1968 | Marzoochi | 428/3.79 |
| 3,622,176 | 11/1971 | Byer . | |
| 3,794,349 | 2/1974 | Fuller . | |
| 4,097,064 | 6/1978 | Ikawa et al. | 280/732 |
| 4,120,516 | 10/1978 | Takamatsu et al. | 280/728 B |
| 4,246,213 | 1/1981 | Takamatsu et al. . | |
| 4,289,717 | 9/1981 | Bortz . | |
| 4,350,544 | 9/1982 | Matsuno . | |
| 4,455,388 | 6/1984 | Robinson et al. . | |
| 4,551,387 | 11/1985 | Manabe et al. . | |
| 4,714,575 | 12/1987 | Preston . | |
| 4,734,230 | 3/1988 | Rhodes, Jr. et al. . | |
| 4,784,336 | 11/1988 | Lu . | |
| 4,791,019 | 12/1988 | Ohta et al. . | |
| 4,852,907 | 8/1989 | Shiraki et al. | 280/731 |
| 4,863,654 | 9/1989 | Belleville et al. . | |
| 4,911,471 | 3/1990 | Hirabayashi | 280/732 |
| 4,923,539 | 5/1990 | Spengler et al. . | |
| 4,923,653 | 5/1990 | Matsuura et al. . | |
| 5,037,591 | 8/1991 | Rohrlach et al. . | |
| 5,073,318 | 12/1991 | Rohrlach et al. . | |
| 5,082,310 | 1/1992 | Bauer | 280/732 |
| 5,084,122 | 1/1992 | Fukushima et al. | 156/252 |
| 5,121,942 | 6/1992 | Warnick et al. | 280/732 |
| 5,125,683 | 6/1992 | Nakajima | 280/731 |
| 5,154,444 | 10/1992 | Nelson | 280/732 |
| 5,158,322 | 10/1992 | Sun | 280/732 |

FOREIGN PATENT DOCUMENTS 2320272  11/1973  Germany ................ 280/728 B Primary Examiner—Karin L. Tyson
Attorney, Agent, or Firm—Reising, Ethington, Barnard & Perry

[57] ABSTRACT

An air bag restraint system is housed within an interior trim product with a hidden door that is opened when an air bag is inflated for deployment into the passenger car or a vehicle. The door is formed in a reinforced segment of a layer of low density rigid foam material that forms the load bearing support for the interior trim product and a backing for an outer skin or decorative surface that forms the outer cover of the interior trim product. The hidden door is formed by cast in place segments in the reinforced segment of the layer of low density rigid foam material a door hinge segment and a weakened tear seam segment which separates when the air bag impacts thereagainst to tear the outer skin for forming an opening therethrough for deployment of the air bag into the passenger compartment of a vehicle.

2 Claims, 5 Drawing Sheets

HIDDEN DOOR FOR AN AIR BAG RESTRAINT SYSTEM

This is a continuation-in-part application of U.S. Ser. No. 07/929,018, filed Aug. 13, 1992, now abandoned.

FIELD OF THE INVENTION

This invention relates to air bag restraint systems known as supplemental inflatable restraints and more particularly to such restraints which are housed in interior trim products of a motor vehicle by a hidden door assembly.

BACKGROUND OF THE INVENTION

Various air bag restraint systems have been proposed in which an access door is arranged behind a continuously formed outer skin or cover. In some cases the underside of the outer skin is perforated or weakened. As shown in U.S. Pat. Nos. 3,622,176 and 4,246,213 the weakened sections represent underlying depressions in the outer cover which show through as an outline of the underlying air bag assembly. Furthermore, such systems require that the outer cover be torn apart at the weakened seams. If the seams are irregular in form the opening force will vary and at times may tend to impede the release of an air bag.

In other arrangements, the cover assembly includes a separate cutting device that will pierce the outer skin. Examples of such separate devices are set-forth in U.S. Pat. No. 4,097,064 and copending U.S. applications Ser. No. 601,406 filed Oct. 22, 1990.

Other cover arrangements for air bag assemblies on the driver side steering wheel location are shown in U.S. Pat. Nos. 4,911,471 and 4,852,907 in which a layer of low density foam is reinforced by a layer of mesh. Such arrangements are configured for attachment to a base plate that is connected by a bracket to the steering column of a vehicle. There is no provision for a separate layer of rigid foam material that is arranged to underlie and fully back a separate cover layer so as to form the load bearing support for an interior trim product such as an instrument panel having a hidden door formed therein. Rather, the cover forms a door that is directly attached to the sides of the air bag container structure.

Other air bag cover assemblies are shown in U.S. Pat. Nos. 3,794,349; 4,120,516; 4,791,019; and 5,082,310. None of these patents show or suggest a air bag cover assembly having a hidden door in a larger interior trim product such as an instrument panel having a passenger side air bag assembly therein and wherein the load bearing support is a low density, rigid foam material located beneath an outer decorative layer and wherein the single load bearing support is formed of a low density material having a thickness and flexural modulus that in combination will produce a resultant door stiffness that will enable the hidden door to penetrate the outer decorative layer to form a deployment opening therethrough, e.g., the door has a stiffness great enough to fracture the materials defining the hidden tear seam.

SUMMARY OF THE INVENTION

The present invention includes a cover assembly for an air bag restraint system which is easily fabricated using standard molding apparatus and which has a load bearing layer of low density rigid material that supports the outer cover of an interior trim product that extends laterally on all sides of a hidden door assembly located beneath the surface of the outer cover and which further includes an integral hidden door operable on air bag inflation to form an opening in the outer cover for deployment of the inflated air bag into the passenger compartment of a motor vehicle.

A feature of the present invention is to form convolutions or segments in the layer of low density rigid material which define a hinge and a weakened tear seam which will provide pivotal movement of a hidden door that will be engaged by the air bag during deployment and that will separate at the weakened tear seam formed in a layer of low density rigid foam material by means of a stiffness that enables the hidden door to fracture the low density foam material and the layer of decorative material defining the weakend tear seam.

Still another feature of the present invention is to provide a cover assembly for concealing an air bag restraint assembly including an air bag, means for imposing a force to deploy the air bag a housing for the air bag, a gas generator located in the housing for supplying gas to the air bag in response to vehicle impact, the cover assembly comprising an outer skin covering an interior trim product within the vehicle and including a backing layer of low density rigid reaction injection mold RIM material behind the outer skin for supporting the outer skin throughout its planar extent and wherein the backing layer has integrally formed hidden seams therein at least one of which is reinforced at a hidden door therein to form a hinge and wherein at least another of the convolutions forms a weakened tear segment which in one embodiment is formed of unreinforced low density rigid reaction injection mold material that will separate at the weakened tear seam and wherein the flexural modulus and the thickness of the low density rigid foam material produces a stiffness that enables the hidden door to break at the hidden seam and to fracture the cover layer to separate and fold back segments of the backing layer and outer skin to form an opening therethrough for deployment of an air bag into the passenger compartment of a vehicle when inflated by the gas generator.

A still further feature of the present invention is to provide a cover assembly for concealing an air bag restraint assembly including an air bag, a housing for the air bag and a gas generator located in the housing for supplying gas to the air bag in response to vehicle impact, the cover assembly comprising: an outer skin covering an interior trim product within the vehicle and including a backing layer of reaction injection mold material having a density in the range of 80 to 961 Kg/m$^3$ (5–60 pounds/ft$^3$), tensile strength in the range of 10 to 15 MPa (1450–2176 psi); flexural modulus of 172 to 6890 MPa (25,000 to 1,000,000 psi), elongation of a mean of 1.9±0.4% and a thickness between 1.5 mm and 10.0 such that the backing layer of reaction injection mold material will have a stiffness that will fracture a hidden seam in the backing layer and to define a hidden door within the cover assembly and having convolutions formed on the inboard surface of the backing layer defining a hinge and a weakened tear section in the hidden door and wherein the tear section will separate to cause the door to penetrate both the backing layer and the outer skin to pierce and fold back segments of the backing layer and outer skin to form an opening therethrough for deployment of an air bag into the passenger compartment of a vehicle when inflated by the gas generator.

In the construction of soft foam insert doors a preformed outer skin or shell member formed by casting vinyl particles on a heated mold surface is seated in a female cavity of a foam mold as set-forth in U.S. Pat. Nos. 4,784,336 and 4,873,032 which are commonly assigned to the assignee in the present application, and are incorporated herein by reference. A first substrate member is supported at construction holes on the lid of the mold which closes to form a mold space between the substrate and the preload vinyl skin. The substrate on the lid can also include a port through which foam precursors are directed into the mold space for reaction therein to form a microcellular foam material that is soft to the feel. The resultant structure is removed from the foam mold and includes a vinyl skin which can be colored and grained to match the aesthetic appearance of the outer vinyl surface of an interior trim product such as an instrument panel having an upper opening therein for the deployment of an air bag. In the present invention there is no substrate and the skin is located in a mold cavity into which the RIM material is inserted in stages with it including reinforced precursors only when filling in the vicinity of the hidden door part of the mold cavity. In the present invention the mold has a member with recesses therein which are configured to form the convolutions. The use of convolutions to form the hinge and weakened tear segment of the hidden door enable the door pattern to assume many forms including rectangular, three sided U-shaped doors, weakened X sections or other geometries depending upon the type of interior trim product and supplemental inflatable restraint which are used in association with the invention.

Another embodiment of the invention configures the convolutions to form a weakened tear segment as a right angular opening that is spaced from the outer layer by less than 1 mm and that forms an eagle beak, as shown in FIG. 6, having an edge thereon that upon fracture will penetrate the outer layer so as to form the opening therethrough for deployment of an air bag into the passenger compartment of a vehicle.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENTS OF THE INVENTION

Figure 1:
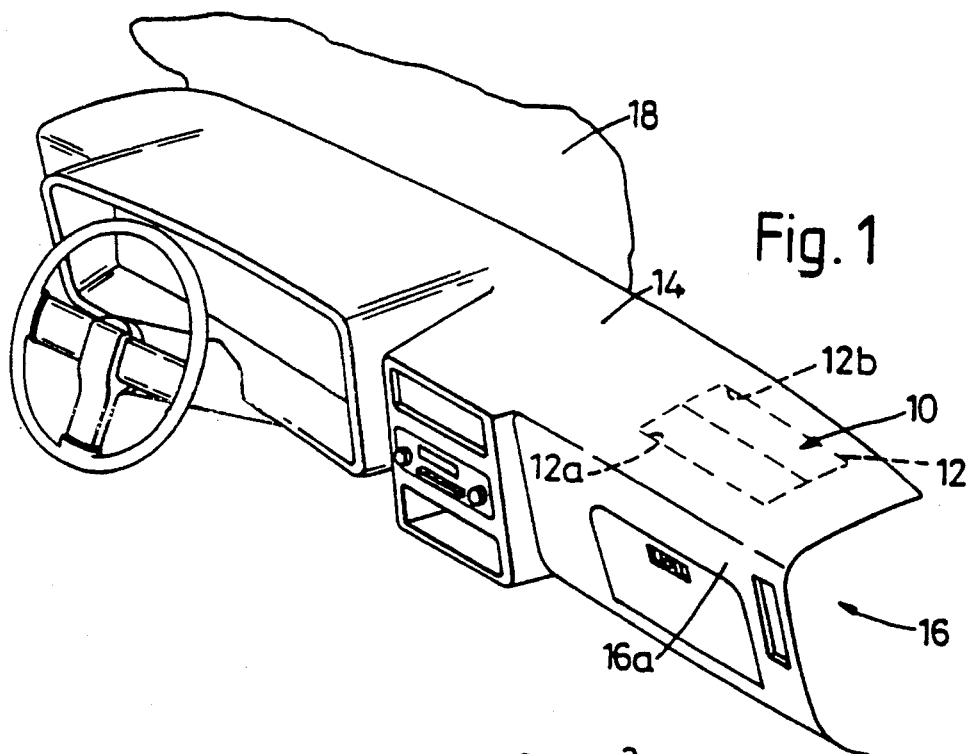
FIG. 1 is a perspective view of an instrument panel or dashboard which is one suitable interior trim product for housing and providing an opening for deployment of an inflatable restraint into the passenger compartment of a motor vehicle.

Referring now to FIG. 1, a door assembly for an opening through which an inflatable restraint safety device is deployed into a passenger compartment is shown at 10. In this embodiment of the invention the door assembly 10 is shown in a top mount position in which it defines a hidden door 12 formed beneath the top surface 14 of a dashboard or instrument panel 16. The door 12 has a front edge 12a located adjacent the front surface 16a of the instrument panel 16 and it includes a rear edge 12b located in underlying relationship to a sloped front windshield 18. While shown in the upper surface of the instrument panel, the door could also be formed in the front surface 16a in what is known as a mid-mount position. The top mount or mid-mount of the door assembly 10 depends upon the location of an underlying air bag restraint system 20. In the illustrated embodiment of FIG. 1, the air bag restraint system 20 includes means for imposing a force to deploy the air bag a gas generator or canister 22 located in a canister housing or casing 24 mounted on a suitable vehicle component not shown. The gas generator has a plurality of openings 22a through which a suitable inflatant gas flows when an impact sensor 26 is actuated upon vehicle impact to condition a controller 28 to initiate gas generation all as is well known to those skilled in the art. The inflatant is directed into the interior of an inflatable air bag 30 connected at one end 30a to the casing 24 and having convolutions 30b which expand as the air bag is inflated to impact against the underside of the door assembly 10 to cause it to pivot upwardly toward the windshield 18 to allow for deployment of the air bag 30 through the opening 12.

In accordance with the invention, the door assembly includes a vinyl outer cover 32 which can be formed from cast vinyl material by processes such as those set-forth in U.S. Pat. Nos. 4,664,864 and 4,784,911, commonly assigned to the same assignee as in the present application. Such outer covers 32 have colors and grain appearances that are accurately matched to the appearance of the surface of an associated interior trim product such as the illustrated instrument panel. The vinyl outer cover 32 is supported by a backing layer of reinforced injection molded material forming a rigid substrate 34 in a foam mold apparatus such as illustrated and described in U.S. Pat. No. 4,806,094, commonly assigned to the same assignee as the present invention. In accordance with the present invention the substrate has a region 36 therein reinforced by suitable embedded material such as glass fibers 38, scrim PVC coated nylon as manufactured by Luckenhaus Corporation or other suitable reinforcing material to form the hidden door 12. The RIM foam system is shot into a mold cavity directly behind the grained outer cover 32 which can be polyvinyl chloride (PVC) or acrylonitrile-styrene-acrylic (ABS) vacuum formed with or without a layer of soft foam or alternatively the outer cover 32 can be a cast dry plastisol material or liquid cast plastisol PVC or cast dry plastisol with an expanded thickness for providing a soft feel.

Figure 7:
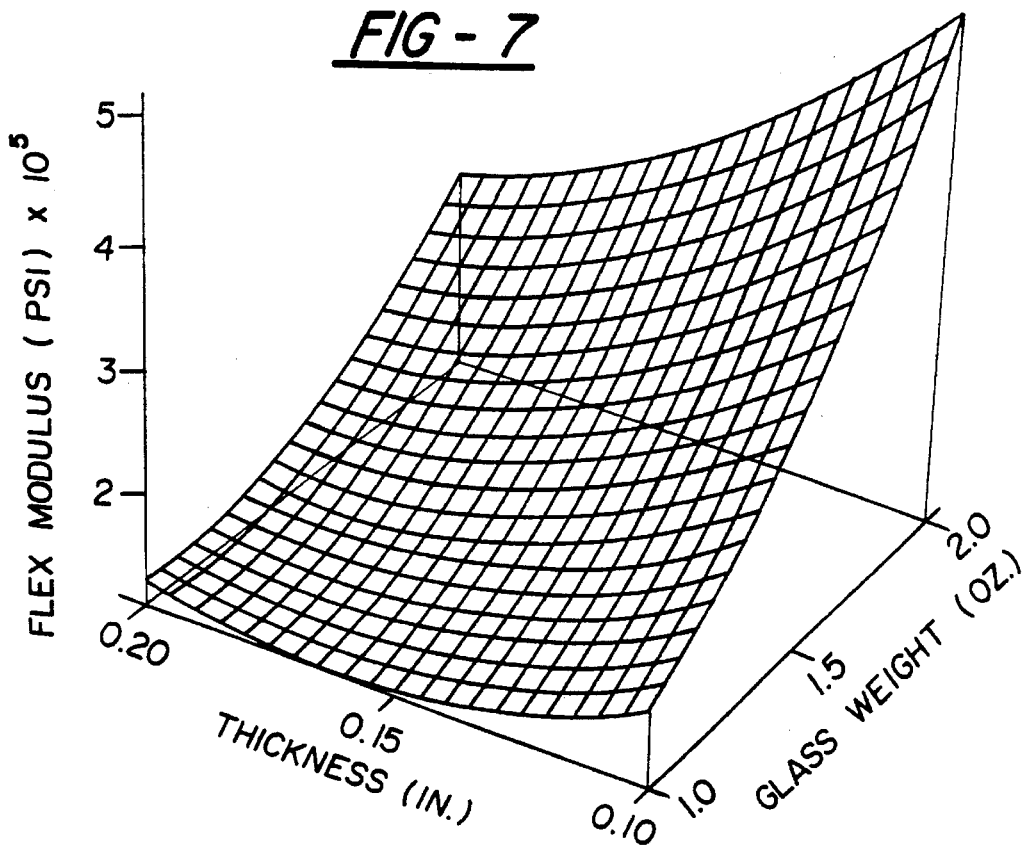
FIG. 7 is a three dimensional plot showing Flexural modulus as a function of thickness and glass weight.
Figure 8:
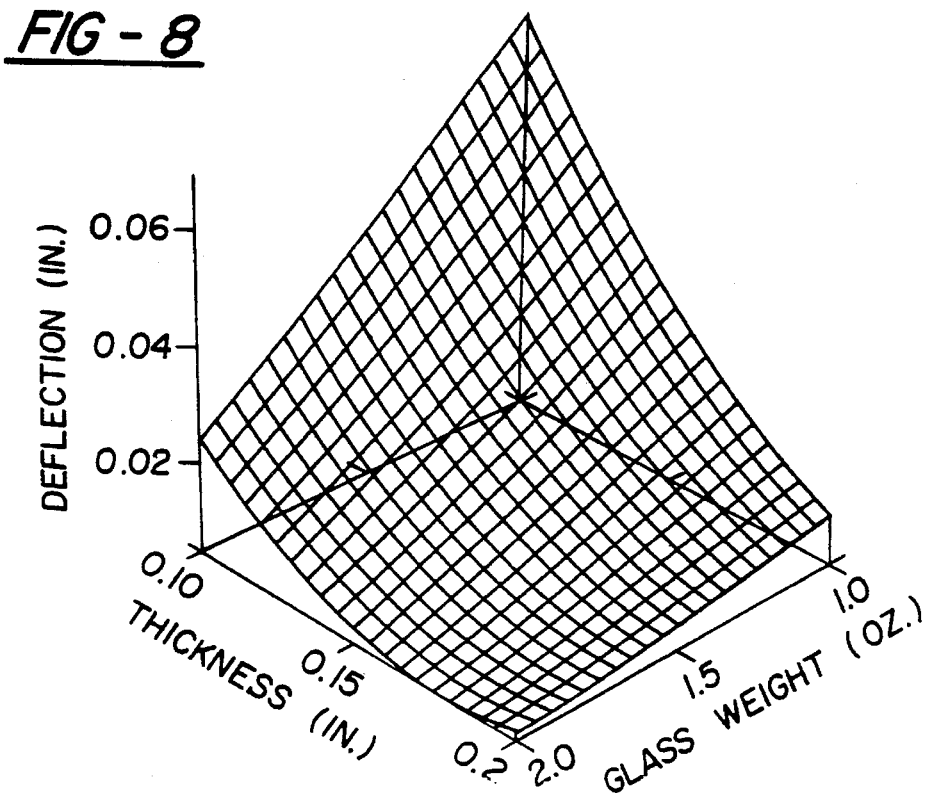
FIG. 8 is a three dimensional plot showing deflection as a function of thickness and glass weight.
Figure 9:
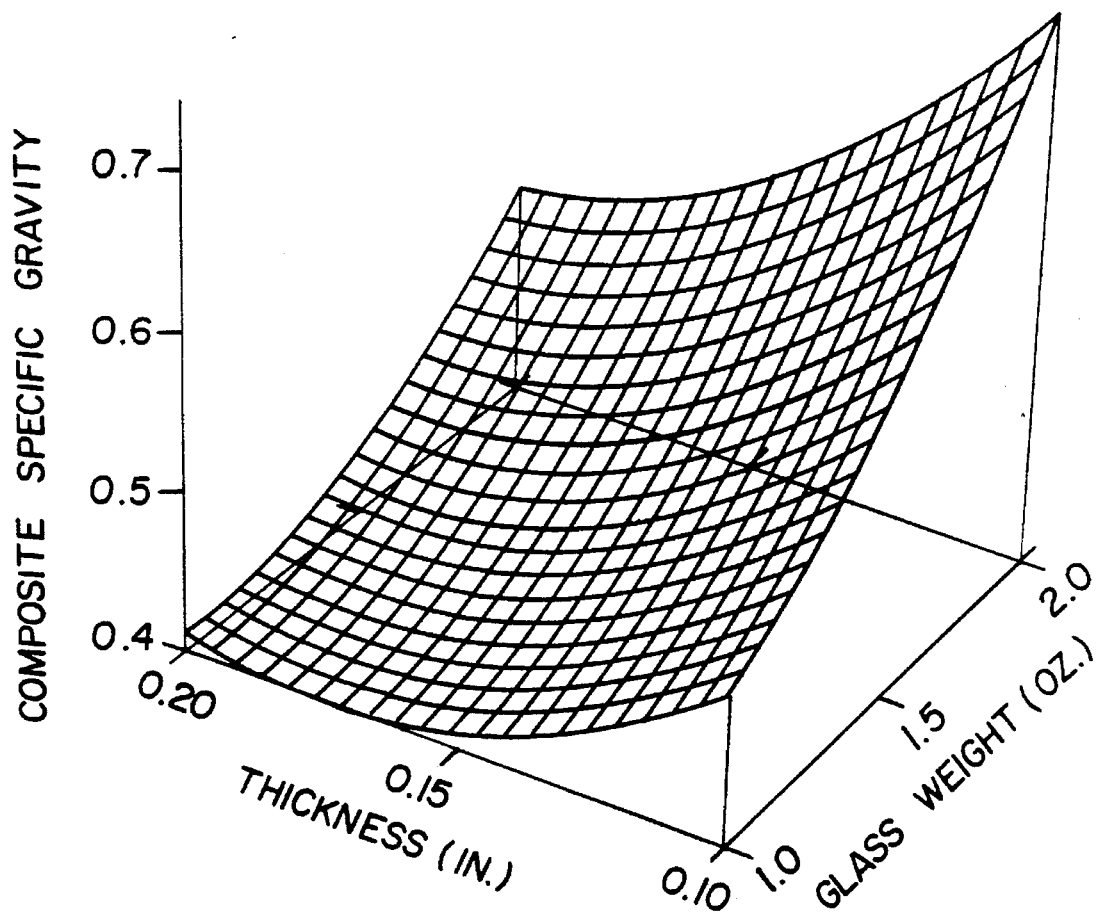
FIG. 9 is a three dimensional plot showing composite specific gravity as a function of thickness and glass weight.

The outer cover 32 will be supported by the backing layer or rigid substrate 34 to match the styling and appearance of a foamed interior trim product. The rigid substrate 34 is a backing layer of reaction injection material such as ICI 8709B and ICI 8700A urethane foam supplied by ICI Americas Inc. In a representative embodiment stiffness of the rigid substrate, formed with one layer of fiber glass mat is illustrated by the FIGS. 7–9 and the low density rigid material is further compared to prior art samples in the competitive analysis of samples summarized in the following table.

Figure 4:
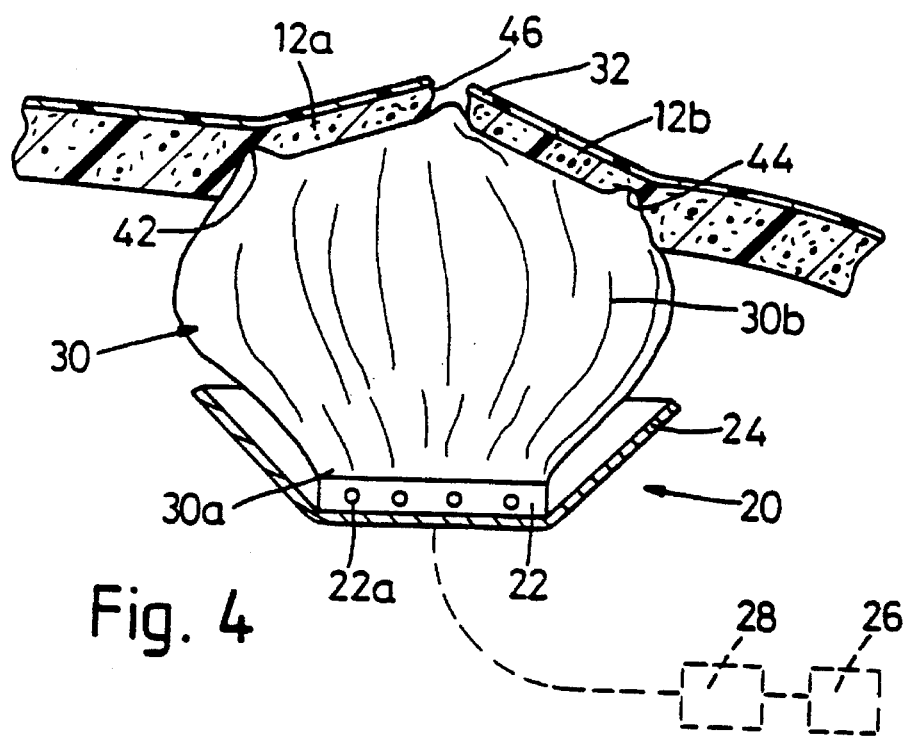
FIG. 4 is an enlarged sectional view like FIG. 3 but showing the retainer in a partially opened air bag deployment position.
Figure 5:
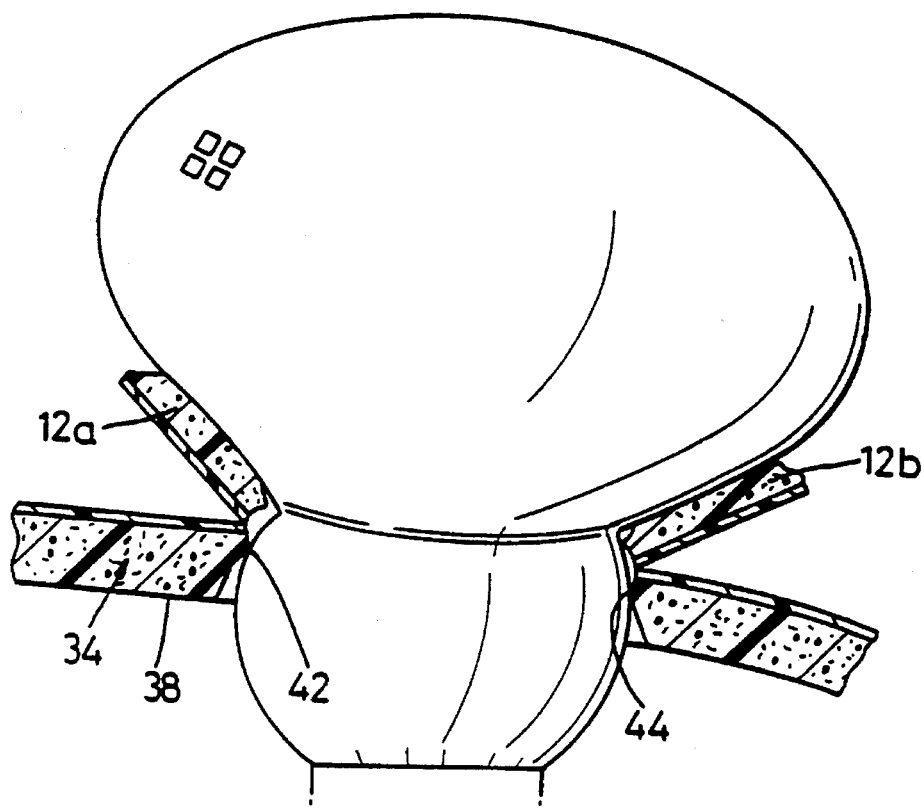
FIG. 5 is an enlarged sectional view showing the retainer in a fully opened air bag deployment position.

The density (specific gravity) of the material in the present invention (DITT) is 0.38±0.02 compared to 0.70±0.01 and 1.07 in prior art samples in the competitive analysis. The density in kg/m$^3$ of the material in the present invention is 384 compared to 672 and 641 in prior art samples. Further, the rigid aspect of the material is shown in a flexural modulus measurement of 641±46 MPa compared to prior art material of 640±143 MPa of 2-fold higher density and a prior art material of 2700 MPa of three-fold higher density. The rigid aspect is also shown in the tensile strength and elongation of the present invention samples (DITT) compared to the prior art samples in the competitive analysis.

forming weakened sections at the sides of the door segments 12a, 12b. The weakened tear seams defined by the side recesses 40, 41 and the intermediate convolution 46 are not reinforced by the glass fibers 38. Accordingly, when the air bag is inflated as shown in FIG. 4, the convolution 46 will separate to tear the cover 32 to allow the two door segments 12a, 12b to pivot upwardly about the convolutions 42, 44 forming the hinges. When the door segments 12a, 12b are fully vertical the convolutions 42, 44 form curved relief surfaces for smoothing the deployment of the air bag into the passenger compartment. Specifically, when the embedded material is PVC coated nylon, the mat should extend 3 to 6 inches beyond the outer door edges and should include slits or cuts to match the weakened tear seams in the rigid RIM foam.

In all cases, deployment of an air bag causes it to impact the inside surface of the retainer 34 to force the door

| SAMPLE: CHARACTERISTIC* | COMPETITIVE ANALYSIS | | | ASTM TEST |
|---|---|---|---|---|
| | DITT FN-10 Q/P | Inland Buick C D/P | Lustran 246 ABS | |
| Density (Specific gravity) | 0.38 ± .02 | 0.70 ± .01 | 1.07 | D-3574 |
| Density | | | | |
| lbs/ft$^3$ | 24 | 42 | 40 | |
| kg/m$^3$ | 384 | 672 | 641 | |
| Thickness in mm | 4.65 | 2.67 | 2.5 | |
| Ash % | 16.4 ± 1.2 | 14.9 ± 0.9 | — | |
| Flexural Modulus | | | | D-790 |
| in MPa | 641 ± 46 | 640 ± 143 | 2,700 | |
| in kg/cm$^2$ | 6.536 | 6,526 | 27,532 | |
| in psi | 92,970 | 92,826 | 391,608 | |
| Tensile Strength[1] | | | | D-638 |
| in MPa | 12.9 ± 1.0 | 22.8 ± 5.5 | 33 | |
| in psi | 1,871 | 3,307 | 4,786 | |
| in kg/cm$^2$ | 131.5 | 232.49 | 336.5 | |
| Elongation[2] % | 1.9 ± 0.4 | 2.7 ± 0.4 | | D-638 |
| Hardness | 87.8 ± 1.5 | — | 113[3] | D-2240 |
| Water Absorption % | 2.8 | 2.3 | | D-570 |
| Flammability mm/min | SE/NBR | SE/NBR | | MVSS 302 |
| Instrumented Impact[4] in J | 11.0 ± 0.7 | 7.1 ± 3.5 | 16.8 | D-3763 |
| Izod Impact (notched) in J/m | 154.3 ± 51.8 | — | 267 | D-256 |
| Heat Sag[5] in mm | No change | 3.0 ± 1.7 | | |
| HDT, °C. @ 0.45 MPa | 120.8 ± 10.4 | — | 93 | D-648 |
| HDT, °C. @ 1.82 MPa | 75.1 ± 5.6 | | 87 | |
| CLTE mm/mm/°C. (×10$^5$) | 1.6 | 1.5 | 8.3 | D-696 |
| Sample ID (PTL#) | #10307 #10308 | #10149 | #10077 | |

All tests are at room temperature unless otherwise indicated. Lustran data from published report.
*Results are given as mean ± S.D. where test was repeated.
[1] @ maximum load and room temperature
[2] @ break and room temperature
[3] Rockwell R
[4] 5.4 KS hg hammer, 787 mm drop height, energy to break, @ 23° C.
[5] 127 mm overhang, 1 hour @ 121° C.

In accordance with one feature of the present invention, the substrate 34 is formed with two spaced side sections 40, 41 and spaced convolutions 42, 44 on the inboard surface 34a thereof. The convolutions 42, form reduced sections in the hidden door 12 that define two spaced hinges for movement of door segments 2a, 12b into an upwardly pivoted position when an intermediate weakened tear seam defined by a convolution 46 formed intermediate the hinges 42, 44 in an inboard air bag impact surface 48.

Figure 2:
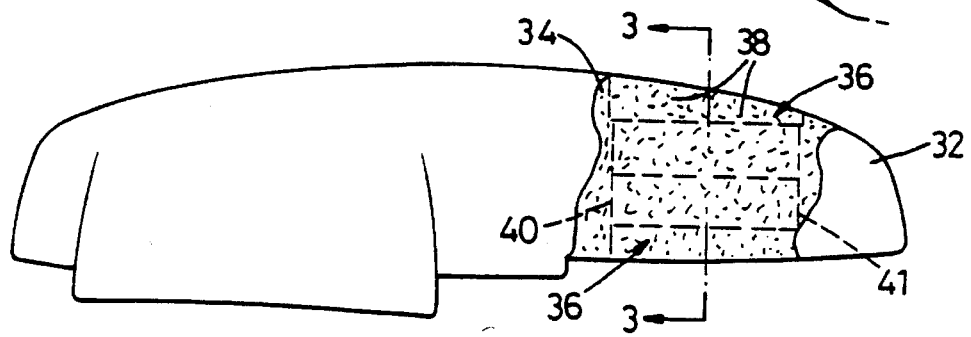
FIG 2 is an enlarged top elevational view of the instrument panel with a portion of an outer cover and its backing foam broken away to show the hidden door retainer of the present invention.
Figure 2A:
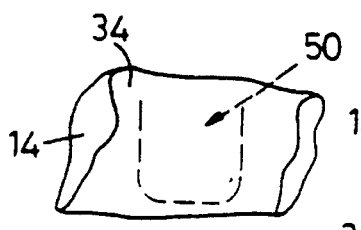
FIGS. 2A, 2B and 2C are top elevational views of other embodiments of the invention.
Figure 2B:
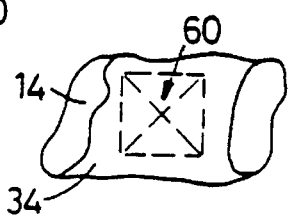
Figure 2C:
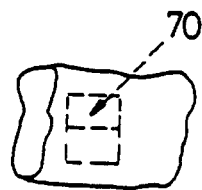
Figure 3:
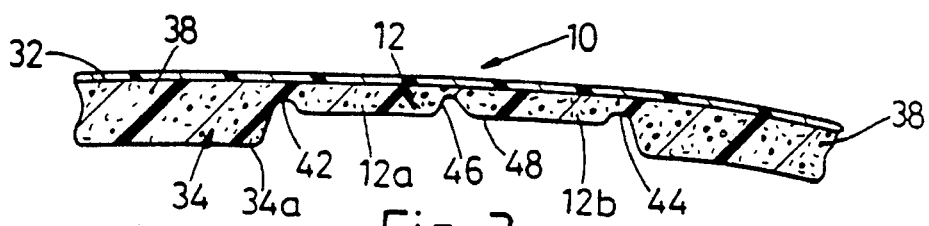
FIG. 3 is an enlarged sectional view of one embodiment of the invention taken along the line 3–3 of FIG. 2.

The hidden door's side sections are recesses 40, 41 segments 12a, 12b upwardly and outwardly so as to produce an opening orange peel type action until the overlying cover material is fully peeled back to define an opening more or less congruent with the outline of the weakened segments in the retainer. Since the hinges and weakened tear segments are defined by recesses or convolutions on the inboard surface of the retainer or substrate 34, the hidden door 12 is completely invisible at the outer surface of the interior trim product. The door pattern is easily varied from the rectangular form to a three sided U form (at 50 in FIG. 2A) or to an X section (at 60 in FIG. 3A) or an H section (at 70 in FIG.

4A) merely by changing the location of the convolutions on the underside of the substrate 34.

The invention provides considerable design freedom since the depth of the convolutions and resulting hinge and tear seam sections can vary greatly without being observable from the outer surface of the cover or without adversely affecting the surface quality of the interior trim product.

The door assembly of the subject invention thereby provides a soft skin door that is easily matched to adjacent interior trim products having foamed in place material and wherein the door assembly can be formed by standard foam molding apparatus without requiring special modifications to substrate components or without modification of the lid for carrying such substrates and wherein a substrate has a rigidity and low density and weakened sections that are invisible from the exterior of an interior trim product so that a passenger is unaware of the underlying air bag restraint system. While the invention is shown in association with a dashboard or instrument panel it is equally suitable for use with other interior trim products such as driver side steering wheel housings. The arrangement is manufactured not only with standard equipment practicing standard steps it enables the door to be used with less steps and in a more cost effective manner than the assemblies in the prior art.

As shown in the aforesaid comparative analysis and in FIG. 4, the substrate 34 is the load bearing support in the assembly. It is a low density material that has a thickness in the range of 1.5 mm to 10 mm and a tensile strength in the range of 10–15 MPa, a flexural modulus range of 172 to 6890 MPa (25,000 to 1,000,000 psi), elongation of a mean of 1.9±0.4% and density of 80 to 961 Kg/m$^3$ (5–60 pounds/ft$^3$). This combination provides a low density material that is rigid.

These thickness and strength properties combine to produce a stiffness in the hidden door 12 that will cause the convolutions 46 to break and penetrate the decorative outer surface defined by cover 32.

Figure 6:
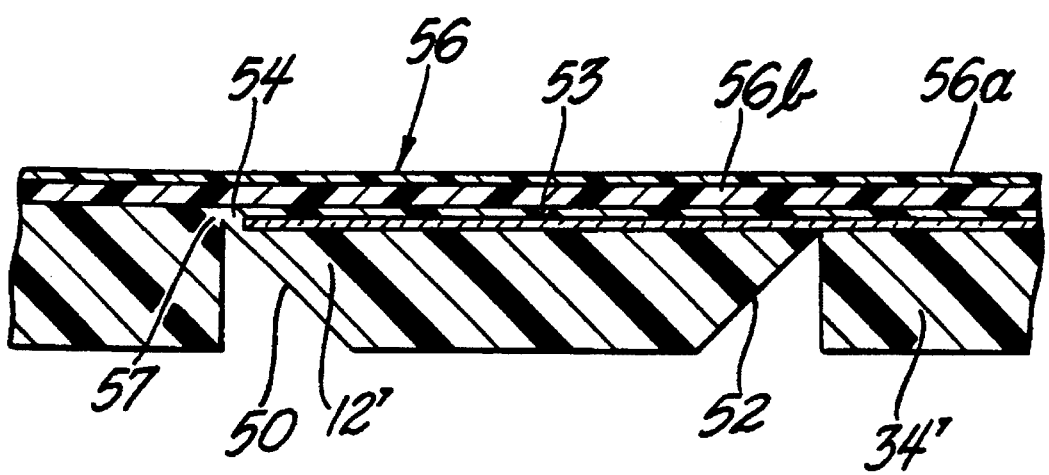
FIG. 6 is an enlarged sectional view of another embodiment of a the invention showing a fragmentary view of a hidden seam therein with an eagle beak thereon.

In the embodiment of FIG. 6, the convolutions are formed as a right angle notch 50 that defines a weakened tear seam in a hidden door 12' at a substrate 34'. A hinge notch 52 is bridged by a layer of glass reinforcement 53. The notch 50 terminates at an acute angle or "eagle beak" 54 that is spaced from an outer decorative surface 56 and extends along the length of an H, U or X tear seam. In other words, as shown in FIG. 6, the notch 50 has one sidewall that is generally perpendicular to the surface 56 and a second sidewall meets it at an acute angle or "eagle beak" 54. The surface 56 is shown as a layer of cast polyvinyl chloride 56a and a layer of expanded polyvinyl chloride 56b for softness. The surface 56 is not cut or notched. The stiffness of hidden door 12 is like that in the previous embodiment and is attributable to like strength and thickness properties. In the embodiment of FIG. 6, the substrate 34' is a rigid urethane that is 10 mm thick. The eagle beak 54 is separated from the surface 56 by a spacing 57 of 1 mm. The PVC layer is 0.9 mm and the expanded PVC is 2 mm. A spray adhesive is provided between the surface 56 and substrate 34'.

The invention has been described in an illustrative manner, and it is to be understood that the terminology which has been used is intended to be in the nature of words of description rather that of limitation.

Obviously, many modifications and variations of the present invention in light of the above teachings may be made. It is, therefore, to be understood that within the scope of the appended claims, the invention may be practiced otherwise than as specifically described.

What is claimed is:

1. An invisible door assembly for a supplemental inflatable restraint device housed within an interior trim product of a motor vehicle comprising an outer skin cover formed as the outer skin of the interior trim product;

a layer of low density rigid material bonded to said outer cover having a hidden door therein, wherein said layer of low density rigid material has a density in the range of 5–60 pcf (pounds/ft$^3$), tensile strength in the range of 10–15 MPa, flexural modulus of 172 to 6890 MPa, and a thickness between 1.5 mm and 10.0 mm;

said hidden door having an inboard impact surface including a hinge region bridged by a reinforcement and a hidden tear seam segment formed in said inboard impact surface;

said hidden tear seam segment being unreinforced and having lesser strength than said hinge region, and wherein said hidden unreinforced tear segment has a configuration wherein a first side wall of said tear segment is generally perpendicular to said outer cover and a second sidewall of said tear segment meets said first sidewall to form an acute angle configuration spaced from said outer cover;

said layer of low density rigid material overlying an inflatable air bag; and means for imposing a force to deploy said air bag against the inboard surface of said layer of low density rigid material and on said hidden tear seam segment whereby tear segment separates, forcing said low density rigid material layer through said cover to form an opening for deployment of an inflated air bag into the passenger compartment of a motor vehicle.

2. An invisible door assembly for a supplemental inflatable restraint device housed within an interior trim product of a motor vehicle comprising an outer skin cover formed as the outer skin of the interior trim product;

a layer of low density rigid material bonded to said outer cover having a hidden door therein;

said hidden door having an inboard impact surface including a hinge region and a hidden tear segment formed in said inboard impact surface;

said hidden tear segment has a configuration wherein a first side wall of said tear segment is generally perpendicular to said outer cover and a second sidewall of said tear segment meets said first sidewall to form an acute angle configuration spaced from said outer cover;

said layer of low density rigid material overlying an inflatable air bag; and means for imposing a force to deploy said air bag against the inboard surface of said layer of low density rigid material and on said hidden tear seam segment whereby said tear segment separates, forcing said low density rigid material layer through said cover to form an opening for deployment of an inflated air bag into the passenger compartment of a motor vehicle.

\* \* \* \* \*